Figure 1:
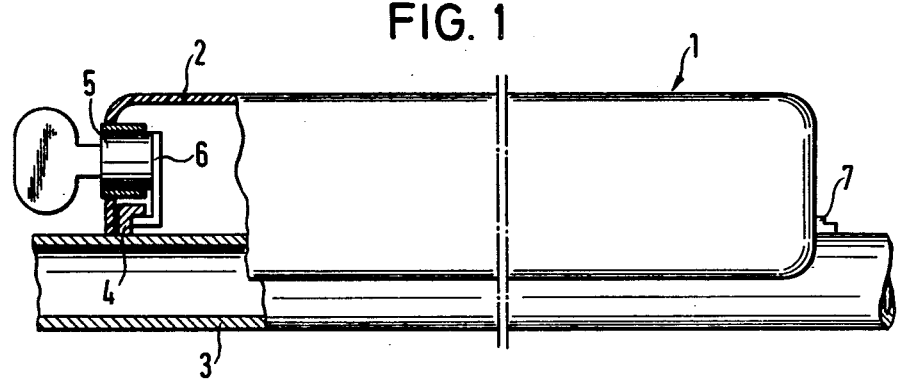

United States Patent [19]

Weiss

[11] Patent Number: 4,469,345

[45] Date of Patent: Sep. 4, 1984

[54] LOCKABLE SAFETY-CONTAINER FOR TWO-WHEELERS

[76] Inventor: Heinz Weiss, Düsseldorfer Str. 103, D-4 Düsseldorf, Fed. Rep. of Germany

[21] Appl. No.: 408,643

[22] Filed: Aug. 16, 1982

[30] Foreign Application Priority Data

Aug. 17, 1981 [DE] Fed. Rep. of Germany ... 8123974[U]
Aug. 20, 1981 [DE] Fed. Rep. of Germany ... 8124288[U]
Jan. 30, 1982 [DE] Fed. Rep. of Germany ... 8202372[U]

[51] Int. Cl.³ .............................................. B62J 9/00
[52] U.S. Cl. ................... 280/289 A; 70/63; 224/32 R
[58] Field of Search ............... 280/289 A, 289 R, 202, 280/816; 220/210; 224/35, 32 R, 30 R; 70/171, 172, 63

[56] References Cited

U.S. PATENT DOCUMENTS 3,777,955 12/1973 Davies ......................... 280/289 A X
3,947,954 4/1976 Weiler ......................... 280/289 R X

FOREIGN PATENT DOCUMENTS 208424 3/1909 Fed. Rep. of Germany .
1181601 11/1964 Fed. Rep. of Germany ...... 280/816
443753 7/1912 France .
2291084 6/1976 France .
2355707 1/1978 France .
420762 5/1947 Italy ................................. 224/35 R
2047644 12/1980 United Kingdom .

Primary Examiner—David M. Mitchell
Assistant Examiner—Mitchell J. Hill
Attorney, Agent, or Firm—Andrus, Sceales, Starke & Sawall

[57] ABSTRACT

A safety-container is removably mounted at an elongated frame member of a two-wheeler and includes closeable locking means so that the container can be neither opened after locking nor removed from the frame member. The mounting means for the safety-container at the frame member are inaccessible from the outside when the container is mounted at the frame member. The mounting means include especially straps, ties, clips etc. by means of which the container is adapted to be clamped at the frame member.

19 Claims, 11 Drawing Figures

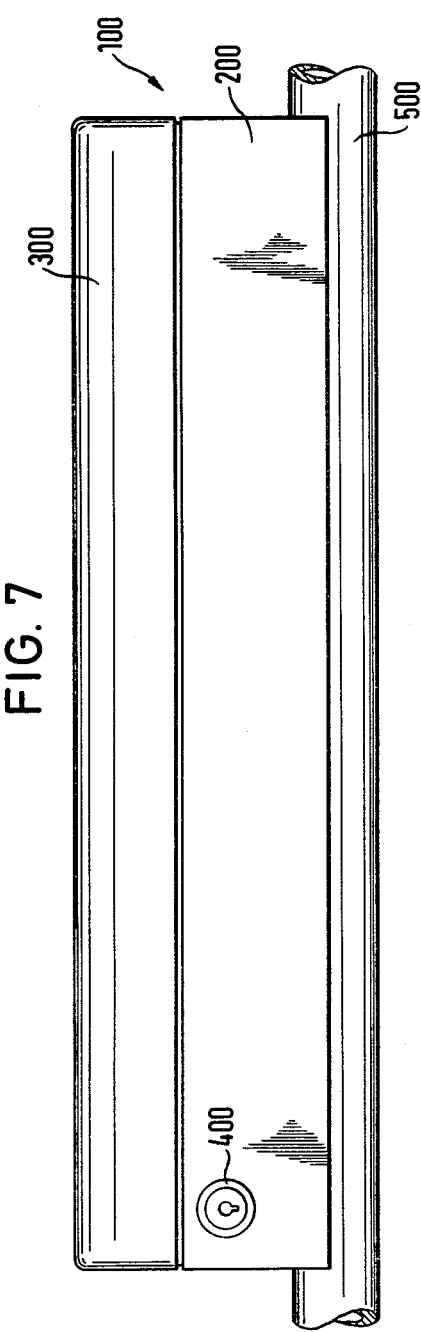
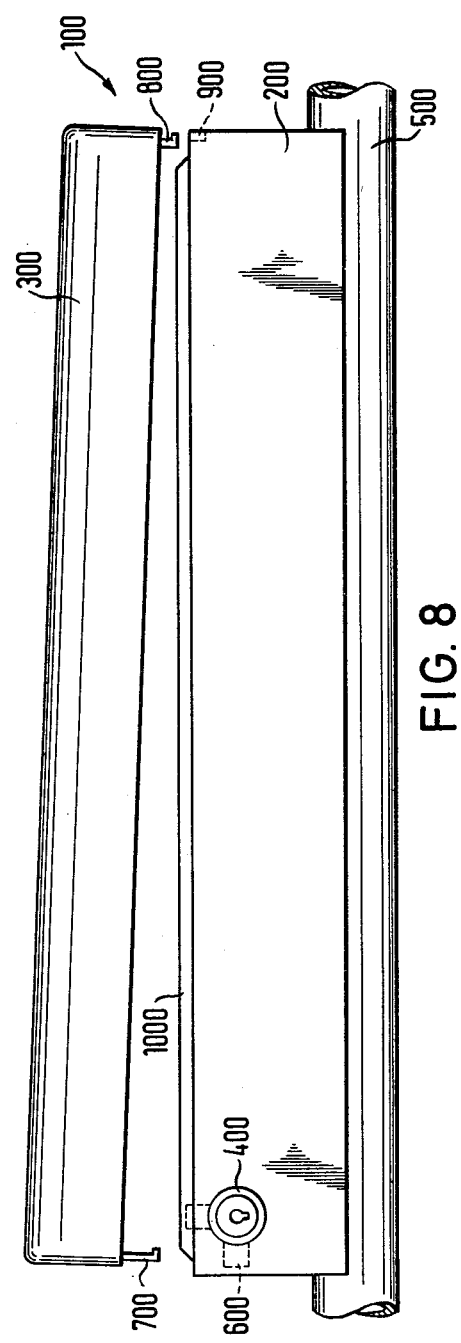

LOCKABLE SAFETY-CONTAINER FOR TWO-WHEELERS

The present invention is directed to a lockable safety-container for two wheel bicycles, sometimes hereinafter called "two wheelers," which is adapted to be mounted on an elongated frame member of the two-wheeler, particularly on a frame bar.

In connection with two-wheelers it is known to store the repair tools in bags made of leather, plastics etc. which are mounted on a part of the frame of the two-wheeler or at the saddle by means of belts, ties etc. The bags can be lockable, however, the bags are not sufficiently burglar-proof due to the removable mounting means. Furthermore, these bags are not suited for the storage of bulky, especially elongate members (pneumatic pump).

Furthermore, it is known to mount containers on the frame of two-wheelers by means of clamping means. This is especially true for drinking-bottles for cycle-racers. The clamping means are designed such that the bottles may be easily removed also during the race. This does not comprehend lockable mounting of the bottles or containers.

The invention has the object to provide a safety-container for two-wheelers which is not only lockable per se but also lockable with the corresponding frame member of the two-wheeler such that the container cannot be removed therefrom in an unauthorized manner.

In order to attain this object the invention proposes a safety-container of the above-mentioned kind which comprises a shell-like container member at least partly encompassing the frame member, the container member being provided with lockable locking means engageable with a locking member disposed on the frame member and/or on a further container member, and with at least one snap-in member or clamping member removably mountable on the frame member and/or the other container member.

Thus, according to the invention the burglar-proof arrangement of the container on the frame member is attained by removably mounting the shell-like container member on the frame member or the other container member by means of the snap-in member or clamping member, the space within the container member serving for the burglar-proof storage of the corresponding article being closed on the one side by the container member and on the other side by the frame member or the other container member. By the following actuation of the locking means which can be a customary stock-lock, a non-removable connection either directly between the container member and the frame member or indirectly by means of the further container member is established. It is evident that in both cases care has to be taken that the locking means functions in such a manner that detachment of the container member from the frame member or from the second container member in any direction is avoided. This is possible without any difficulties since the container is sufficiently fixed at the frame member on the one side by the shape of the container member adapted to the frame member or by passing the frame member through an endwall of the container member and on the other side by the additional snap-in or clamping connections. Thus according to the circumstances the locking means can be designed to securely retain the container member on the frame member against lifting, longitudinal and/or rotational movements.

One embodiment of the invention is characterized by a one-piece container and that the locking means is disposed at an endwall of the shell-like frame member provided with an aperture for passing-through the frame member such that it is engageable with a locking member non-detachably mounted on the frame member. According to this embodiment the container member is practically designed as a half-shell with integrated endwalls, the container member with its longitudinal edges bordering on the frame member or engaging the same. Accordingly, the frame member closes the container member on one side. However, the container member can be also provided with a bottom member adapted to the shape of the frame member, i.e. has usually a concave shape. According to this embodiment the locking member disposed on the frame member passes through an aperture in the bottom member of the container member.

When mounting the container member the snap-in or clamping members provided at its edges engage corresponding elements at the frame member or the frame member itself so that the container is fixed on the frame member. Then the locking means is brought into engagement with the locking member disposed at the frame member. This can be for instance a stock-lock actuatable by means of a key, the lock being provided with a rotatable locking tongue which grips behind and/or under a locking tongue provided on the frame member in its closed position.

In a one-piece embodiment of the container it is particularly practical to give the container member a U-shaped cross-section and to provide the snap-in or clamping members in such a manner that the container member is laterally mountable on the frame member with its two legs. In this relatively simple embodiment the container has approximately the width of a frame bar of a two-wheeler and can be used for instance for the storage of tools or of a pneumatic pump. If necessary, rubber seals are provided at the edges of the free legs or of the two endwalls in order to guarantee a close connection between the frame member and the container. Customary embodiments can be used as snap-in or clamping members, for instance also members based on the principle of a revolving closure.

A further embodiment of the invention is characterized by a two-piece container which is designed as a shell-like member adapted to the first container member, one of the container members being provided with the lockable locking means and the other being provided with the locking member, both of the container members including complementary snap-in or clamping members for removably mounting the same, and one of both of the container members at least partly encompassing the frame member. Accordingly, in this embodiment two shell-like container members which are substantially shaped as shell halves are at first removably mounted to one another for closing of the container which is carried out by engagement of the complementary snap-in or clamping members. By the actuation of the locking means provided at one container member the two container members are fixedly connected, the locking means engaging the locking member provided at the other container member. Also in this case locks can be used which are correspondingly shaped. When assembling the container at first the container member encompassing the frame member is removably fixed or secured on the frame member. This can be done by means for fixation in axial, radial and/or circumferential directions which are provided at the container member. Herefore the corresponding container member can be for instance provided with clamping means in the form of spring cramps which establish clamping engagement between the frame member and the container member when the container member is set upon the frame member. Now, the other container member is fastened at the container member already fixed or secured to the frame member whereupon locking of both members results.

Accordingly, in this embodiment the container in its closed condition encompasses the frame member which extends through the two endwalls of the container. Also in this case suitable seals may be provided between container and frame member or between the two container members. Normally, securing the container member encompassing the frame member by suitable clamping means is sufficient in order to non-displaceably mount the container on the frame member. If this should not be case additional means, for instance in the form of snap-in lugs, may also be provided at the container members or at the frame member in order to prevent longitudinal displacement of the container on the frame member or rotation of the same.

The snap-in or clamping members between the two container members may be formed as in the abovedescribed embodiment. If necessary, one of the container members may be provided with an overlapping flange.

In a practical two-piece embodiment of the container two locking members in the form of tongues entering into the other container member are provided at the one container member and a locking tongue of the locking means passes through the two tongues in the locked condition of the two container members. The two locking tongues extend preferably in the region of the container walls so that the space within the container is not substantially restricted. Of course, equivalent locking constructions may also be used, for instance constructions as used in the first embodiment.

A further embodiment of the invention is characterized by a three-piece container comprising two complementary shell-like container members as well as an endwall serving as a container lid which, if necessary, is provided with an aperture for passing through the frame member. According to this embodiment the endwall and the two shell-like container members include snap-in or clamping members for removably mounting the same against one another. The endwall is provided with the locking means and the container member belonging to the endwall with the locking member. Also in this embodiment at least one shell-like container member should be provided with securing means on the frame member in axial, radial and/or circumferential direction of the same. The assembly is realized in similar manner as with the preceding embodiment whereby at first the one container member is fixed or secured on the frame member. Next the endwall serving as container lid is set upon the frame member and removably connected with the fixed container member by the snap-in or clamping members. Finally, the second shell-like container member is set-on or slipped-on the frame member to engage the two other members. Hereafter the locking step is done. It is evident that suitable sealing means may be provided between the several container members or between the container members and the frame members.

According to the preceding three-piece embodiment only the endwall must be locked to the container member set-on or slipped-on since the container member fixed or secured on the frame member can no longer be removed from the other members due to the engagement of the snap-in or clamping members with the corresponding members of the endwall and of the other container member. It is evident that the endwall serving as a container lid can be provided with suitable mounting flanges or connection flanges in order to enable correct fastening on the frame member or the one container member and a correct connection with the container member slipped on.

A further embodiment of the invention is characterized in that the endwall serving as container lid is mountable in a stationary manner at the frame member, in that the container casing provided with the other endwall is removably mountable on the frame member in a position engaging the stationary endwall, and in that both members are lockable by means of lockable locking means disposed at the stationary endwall or the container casing and adapted to engage the other member.

According to this embodiment the safety-container is made of two pieces, the endwall serving as container lid remaining on the corresponding frame member after mounting while the other container member consisting of the casing and the other endwall is removable from the frame member so that access to the interior of the container is possible. The complete container cannot be removed as a unit from the frame member due to the stationary burglar-proof arrangement of the one endwall on the frame member. Removal of the container casing from the container lid is only possible after unlocking of the locking means which can be done only by means of a suitable key. Furthermore, by the stationary arrangement of the endwall on the frame member it is also made possible that only a single locking means is necessary for the burglar-proof arrangement of the container. That is, the locking means disposed between the stationary endwall and the container casing fulfills two functions: on the one side it secures the container lid at the remaining container portion and on the other hand it assures fastening of the container on the corresponding frame member, said fastening not being burglar-proof with the above-mentioned known tool bags.

It is of course of inventive importance that the endwall itself disposed in a stationary manner on the frame member is arranged in a burglar-proof manner. This can be attained for instance by non-removably mounting the endwall on the frame member by the manufacture of the two-wheeler itself, for instance by welding (of course, also subsequent welding is possible) or by removably mounting the endwall by means of ties, clips etc. encompassing the frame member. In the last-cited case the fastening elements for the ties, clips etc. have to be arranged such that they are inaccessible from the outside after setting on the container casing. This can be made possible for instance by letting the same engage in recesses provided at the container casing for this purpose.

The last-mentioned embodiment of the invention has the advantage that it can be supplementarily mounted on any two-wheeler in a relatively simple manner while with the preceding embodiment the manufacture requires special provisions. When the safety-container is subsequently mounted initially the endwall serving as the container lid is fixedly and non-displaceably mounted at the respective frame member by means of the corresponding fastening element (clip, tie, etc.). When doing this care has to be taken that the fastening member (screw) for the clip is located in a position in which it is later covered by the remaining portion of the container and is thus no longer accessible from the outside. Next, the remaining container portion is removably fixed at the frame member in a position engaging the stationary endwall. Depending upon the design of the locking means different mounting methods may be used in order to attain this. Accordingly, simply resting the container on the frame member may be sufficient for instance in the most simple case. Also corresponding clamping means etc. may be attached. Care need only be taken that the container is sufficiently fixed or secured on the frame so that it is not released by the shocks or vibrations during riding, and that the removable mounting possibly contributes to the burglar-proof attachment. It is for instance especially practical to removably fasten the container casing on the frame member by means of at least one snap-in connection. This brings not only a safe securement and a further improvement of the burglar-proof attachment but also the advantage of a fast and easy detachment of the container casing from the endwall remaining stationary on the frame member.

Of course, also the snap-in member of the snap-in connection associated with the frame member should be attached on the frame member such that it cannot be detached from the same in an unauthorized manner. Accordingly, analogous to the stationarily attached endwall the snap-in member may be already welded to the frame of the two-wheeler by the manufacturer. However, subsequent mounting is also possible by means of the above-mentioned clips, ties etc. Also in this case the fastening element for mounting of the clips or ties on the frame member should be located such that it is later covered by the container casing and is thus only accessible after removal of the container.

As regards the design of the snap-in connection the invention is in no way restricted if only care is taken with respect to the above-cited features. So it is for instance possible to form the snap-in element for the frame member as a projecting lug introduceable into a correspondingly shaped recess in the container casing and clampingly overlapping a portion of the container casing adjacent to the recess by axial displacement of the container casing. Of course, the reversed embodiment is possible according to which a tongue formed on the container casing engages in a corresponding recess in a fastening element (clip) extending around the frame member. In any case, the snap-in connection should always produce a sufficient clamping force so that the container casing may be only detached from the frame by the application of a corresponding force.

As already mentioned above the detachable portion of the container is fastened on the frame member to engage the stationary endwall. For this purpose the stationary endwall serving as lid is provided with a circumferential flange and a corresponding seal, the container casing being slid or set over the flange so that it closely engages the seal (rubber ring etc.) with its forward edge. By locking the endwall with the container casing the press fit of the casing at the endwall is maintained so that a close connection between lid and casing is achieved.

The locking means is disposed for practical purposes, at the stationary endwall and actuatable by a key introduceable from the accessible side of the endwall into a lock at this location. By rotating the key in the lock a cylinder guided in a sleeve is rotated, the cylinder having at its back end a locking tongue. In its closing position the locking tongue grips behind or under a horizontally extending tongue at the container casing. By this the container casing is secured not only against lifting but also against drawing from the endwall. It is evident that the above-described locking means is only exemplary and does not restrict the subject matter of the invention.

Locking means which fulfill the same or a similar function may be also used.

The endwall serving as a container lid has a suitable engaging portion for fastening on the frame member by means of clips, ties etc. This can be for instance a flange adapted to the shape of the frame member, the clip encompassing this flange. However, the endwall can have also such a shape for instance that the clip passes through apertures in the axially extending circumferential flange. Finally, the endwall and the respective fastening element can be also integrally shaped.

As regards the shape of the container the invention has no restrictions in principle. The shape depends primarily on the contents to be stored in the container and on the special frame member on which the container is to be fastened. So it will be for instance practical for bicycles to select a round container shape approximately adapted to the shape of a frame bar. In this case the containers should preferably enable the storage of a pneumatic pump. As already mentioned above the container casing has preferably such a shape that a portion thereof is adapted to the corresponding frame member. The frame bar can also extend completely through the container. However, in this embodiment the one container member is not removable from the bar but only displaceable on the same. Accordingly, in most of the cases the container will have a tubular shape which, however, is not to exclude box-like embodiments.

Finally, it has to be pointed out that the container may be mounted not only vertically but also in an inclined or horizontal position. This depends on the position of the corresponding frame member.

A further embodiment of the invention is characterized in that the shell-like container member is open at its side turned away from the frame member and is closeable by a second container member serving as container lid, and in that the snap-in or clamping member is a clip encompassing the frame member, engaging into the shell-like container member and biased by the same and adapted to engage a fixing or securing element disposed at the inside of the container member.

Accordingly, this safety-container is a two-piece container, the second container member serving as lid being mountable onto the shell-like container member and lockable with the same. The fastening of the shell-like container member at the frame member is selected to be non detachable from the outside without any access to the safety-container. In order to fasten the safety-container initially the clip is mounted on the frame member; thereafter the shell-like container member is positioned on the clip such that the free ends of the clip extend into the container member and are biased. They engage a securing member disposed on the inside of the container member, the bias producing a clamping effect. For removing the container member from the frame member the free ends of the clip may be urged from the inner surfaces of the container member to the inside by means of a tool, for instance a screw driver, so that the container member may be removed upwardly. Then the clip can be dismounted from the frame member.

The safety-container can be mounted on the frame member to be positioned either above or below the same. Both possibilities are feasible with the above-mentioned mounting method.

For a safe fastening of the second container member on the shell-like (first) container member the second container member includes at one endwall a snap-in lug grasping behind a retainer at the endwall of the first container member and at the other endwall the locking member for the locking means (lock) laterally disposed at the first container member. Accordingly, if the second container member (lid) is mounted on the first container member initially the snap-in lug is guided under the retainer and then the other lid end is set into the first container member. The locking means (lock) includes a locking tongue rotatable by a key and adapted to engage the locking member. This locking tongue is turned by rotation of the key in the lock until it engages behind the locking member at the lid. Accordingly, the lid and the first container member are locked with one another when the key is withdrawn. Also the other lid end cannot be detached from the first container member due to the snap-in lug engaging under the retainer.

In order to fixedly mount the lid and the first container on their abutting surfaces also in longitudinal direction of the same, at the open end of the sidewalls of the first container member inner guide webs for the second container member are provided. It is evident that the lid walls include corresponding recesses for these guide webs. Preferably, the guide webs extend approximately over the whole length of the container. Only the forward and backward end portions may be left free in order to enable introduction of the snap-in lug and mounting of the other lid end.

The second container member (lid) preferably includes in the forward and backward end portion a respective cross wall with an inwardly projecting lug for securely clamping a pneumatic pump. This embodiment is particularly advantageous if the safety-container is to serve for the storage of the corresponding tools for a two-wheeler. In this embodiment the container width is selected such that the pneumatic pump may be stored within the lid.

Although it is not absolutely necessary that the first container member has a bottom member, in a special embodiment it includes such a bottom member adapted to the shape of the frame member, the bottom member having at least two opposite edge apertures for passing through the free clip ends. Above the bottom apertures inwardly projecting retainer lugs are disposed at the sidewalls of the first container, the angled free clip ends engaging behind the same. From a practical standpoint, a clip for fastening the container is disposed at the forward and the backward end portion of the same, respectively.

It is also possible to form a fastening as a shell that extends over the entire length of the container and totally encompasses the frame member.

The first container member may be provided with a plurality of cross walls in order to make possible a division into compartments which may be used for instance for the storage of different repair materials.

The preferred material for the manufacture of the safety-container is impact resistant and weathering resistant plastics. A customary metal lock may be used as lock. The plastic members may be also combined with metal clips.

Figure 2:
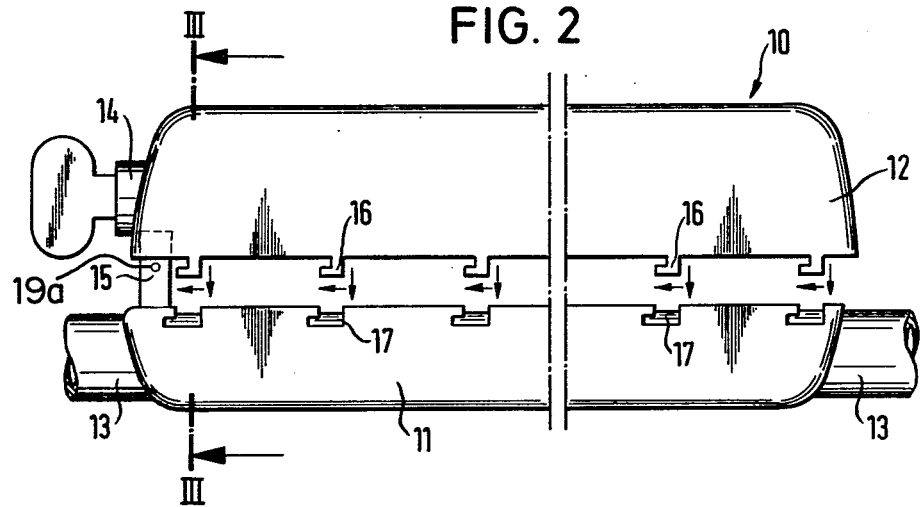
Figure 3:
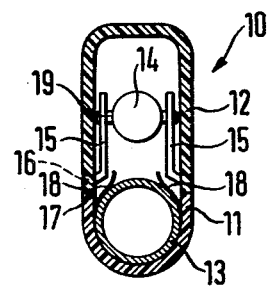
Figure 4:
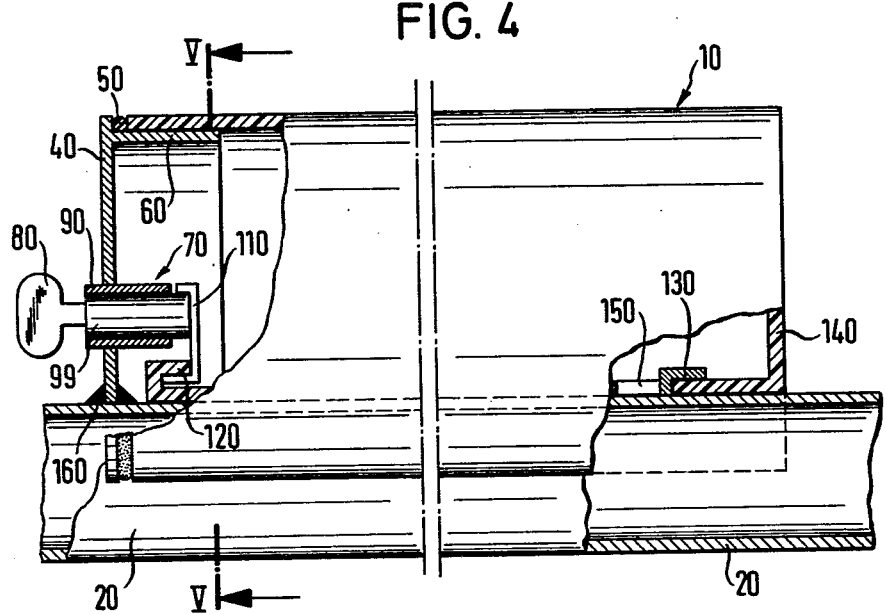
Figure 5:
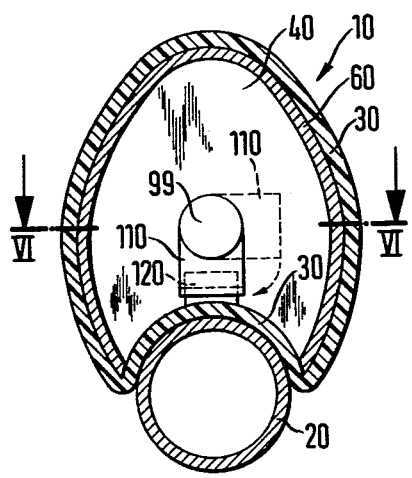
Figure 6:
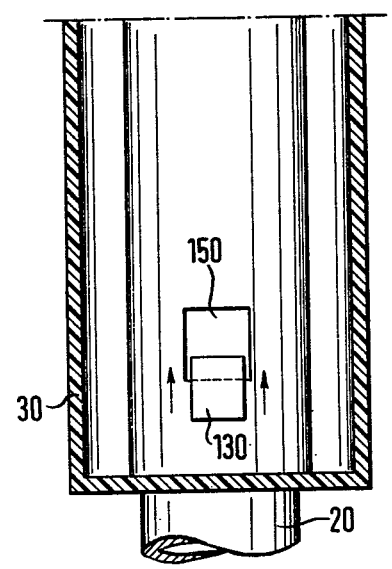
Figure 9:
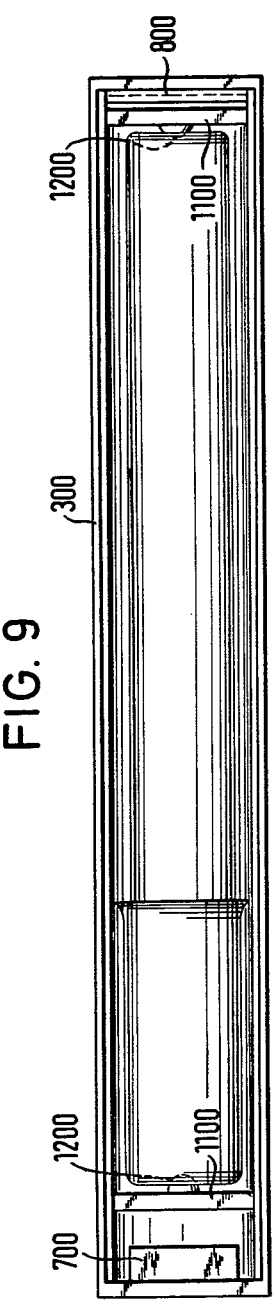
Figure 10:
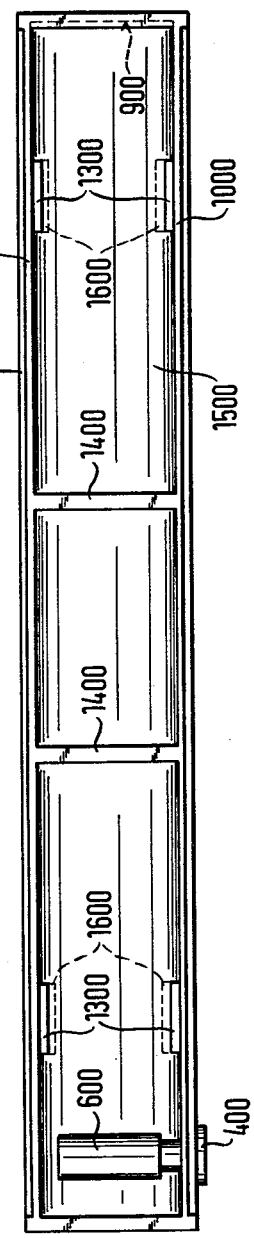

The invention is now described in detail in connection with preferred embodiments of the same and with the drawings. The drawings show:

FIG. 1 a schematic side view, partly in section, of a first embodiment of an inventive safety-container;

FIG. 2 a schematic side view of a second embodiment of a safety-container, the two container members being shown prior to their connected condition;

FIG. 3 a cross-section along line III—III in FIG. 2;

FIG. 4 a schematic side view of a further embodiment of a safety-container, partly in section;

FIG. 5 a cross-section along line V—V in FIG. 4;

FIG. 6 a longitudinal section along line VI—VI in FIG. 5;

FIG. 7 a side view of still another embodiment of a safety-container with mounted and closed lid;

FIG. 8 a side view of the container shown in FIG. 7 with removed lid;

FIG. 9 a view of the lid from underneath;

FIG. 10 a plan view of the shell-like container member; and

Figure 11:
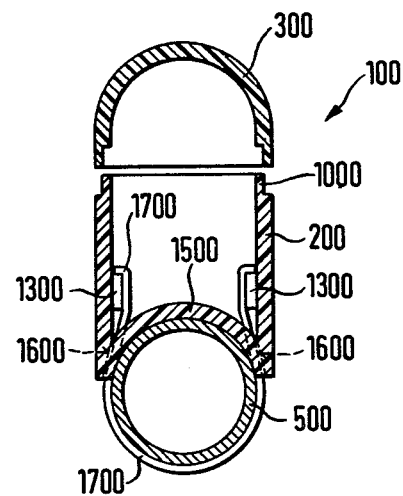

FIG. 11 a cross-section through the container fastened at the frame member by means of a clip.

FIG. 1 shows a one-piece embodiment of a safety-container 1 according to which the container member 2 formed as a half-shell is removably fixed or secured on a frame member 3 by means of suitable snap-in or clamping elements (in the drawing only one element 7 is shown). After the container member 2 has been positioned on the frame member 3 at the corresponding location a locking means 5 in the form of a stock-lock disposed at the forward endwall of the container member is actuated by means of a key thereby turning a locking tongue 6 and bringing the same in a position in which it engages behind and under a locking member 4 attached to the frame member 3 or integrally formed with the same. Accordingly, after removing the key the container is attached at the frame member in a burglar-proof manner. The container is secured by the interlocking in axial, radial and circumferential direction of the frame member in cooperation with the corresponding snap-in or clamping elements 7 which engage corresponding elements disposed on the frame member.

FIG. 2 shows a two-piece embodiment of a safety-container 10. The safety-container consists of an upper container member 12 and of a lower container member 11 both in the form of a half-shell. The lower container member 11 serves for securing the container on the frame member 13 while the upper container member 12 substantially encloses the space provided for the articles to be stored and includes a locking means 14 on its forward endwall.

The assembling of the container 10 is realized in the following manner. Firstly, the lower container member 11 is disposed in its position at the frame member 13. In the embodiment shown in FIGS. 2 and 3 this is done by means of several spring clips 18 securing the container member 11 on the frame member 13. These clips are only shown in FIG. 3. Further means may be provided for securing the container, for instance snap-in lugs etc., if the spring clips should not be sufficient.

Two upwardly extending blade-like locking members 15 are disposed at the forward end of the lower container member 11. In the assembled condition of the container these locking members 15 extend into the upper container member 12 and establish the locking engagement with the locking means 14. This can be done for instance by moving a locking bar 19 on both sides of the means outwardly upon actuation of the locking means 14 so that the locking bar passes through corresponding recesses 19a in the locking members 15. Upon unlocking this step is reversed. It is evident that the shown and described kind of locking is only exemplary and may be replaced by equivalent means.

After the lower container member 11 has been secured on the frame member 13 in a suitable manner the upper container member 12 is mounted on the lower container member. When doing this the schematically shown snap-in elements 16, 17 are engaged by a downward movement and subsequent horizontal movement of the upper container member 12 relative to the lower container member. Now, the two container members are detachably secured together. Then the locking means 14 is actuated in the above-described manner so that a burglar-proof fastening of the container 10 at the frame member 13 is attained after the corresponding key has been removed. For opening the container the preceding sequence is reversed.

It should be mentioned that it is not absolutely necessary that the two container members in their assembled condition are butt joined. Also corresponding overlapping flange constructions may be provided which may additionally include suitable sealing members.

Also the safety-container 10 shown in FIGS. 4 to 6 is adapted to be mounted on the horizontally extending frame bar 20 of a bicycle and serves for the storage of tools and of the pneumatic pump of the bicycle. However, this does not exclude the possibility that the safety-container may be also used for the storage of other articles if these should have the corresponding size.

The container 10 consists substantially of two members: a container casing 30 including a rear endwall 140 and a front endwall 40 formed as a container lid. The container has an elongated shape and is substantially oval in cross-section, the portion of the container casing 30 adjacent to the frame bar 20 of the bicycle having a concave shape so that it is adapted to the shape of the frame bar.

As especially shown in FIG. 4 the front endwall 40 serving as container lid is welded to the frame bar 20 at 160. Accordingly, the front endwall is permanently connected to the frame bar and cannot be removed from the same. This kind of mounting of the front endwall is only exemplary; there may be used any fastening method if only the front endwall cannot be detached from the frame bar in an unauthorized manner. When the fastening is carried out by means of clips, ties, straps etc. the fastening means (screws, bolds, rivets) for these elements have to be positioned such that they are covered by the container casing and are no longer accessible from the outside after mounting of the container on the frame bar.

In contrast to the front endwall 40 serving as container lid the container casing including the rear endwall 140 is removably attached to the frame bar 20. The container casing is secured at two points on the frame bar or the front endwall: on the one hand a snap-in connection 130, 150 is provided by means of which the rear portion of the container casing is fixed to the frame bar and on the other hand the front wall 40 includes a locking means 70 securing the front portion of the container casing. The locking means is described in detail later on. It is evident that further snap-in connections may be provided by means of which the container casing is adapted to be mounted on the frame bar or additionally on the front endwall as well. In the shown embodiment a snap-in element 130 in the form of a lug is welded to the frame bar.

Furthermore, the front endwall 40 serving as the container lid is provided with an annular circumferential flange 60 which is somewhat inwardly offset with respect to the edge. When assembling the container the container casing 30 is slid on this flange. It assumes an abutting relationship with a seal 50 in the form of a rubber ring which is to guarantee a close connection between the container casing and the front endwall.

Finally, a locking means 70 in the form of a simple stock-lock is disposed in the front endwall 40. Turning the key 80 causes rotation of a cylinder 99 guided in a sleeve 90, the cylinder having at its rear end a locking tongue 110. The locking tongue 110 is moved from the position shown in FIG. 5 with dashed lines into the position shown in FIG. 5 with solid lines and engages under and behind a locking tongue 120 disposed at the container casing 30. Accordingly, after having removed the key 80 the container casing 30 is securely locked with the front endwall 40 serving as container lid since the tongue 110 secures the container casing against drawing off backwardly and lifting from the frame bar. A lateral movement of the container casing is not possible as well because of the flange 60 of the front endwall 40. Since also the rear portion of the container casing is securely fixed on the bar 20 by the snap-in connection 130, 150, the container casing cannot be lifted from the bar also in this region. Accordingly, the container is securely fastened at the frame bar and can be removed from the same only by turning the key of the lock and unlocking of the locking means.

If the container casing 30 including the endwall 140 is to be again locked with the bicycle bar it is positioned on the bar so that the lug-like snap-in element 130 passes through the aperture 150 of the container casing. In this position the front locking tongue 120 is not yet in its final position in which it can engage the tongue 110. By forwardly pushing the container casing towards the front endwall 40 the container casing engages under the lug-like snap-in element 130 whereby the snap-in element 130 exerts a clamping pressure onto the container casing and urges the same against the frame bar 20. The casing is pushed against the end-wall 40 until it slides on the flange 60 of the endwall and engages the rubber seal 50 and further movement is prevented by the snap-in element 130 or by the endwall 40. In this position the locking means 70 is actuated by turning the tongue 110 behind and under the tongue 120 disposed at the container casing. By removing the key 80 the locking procedure is finished.

The safety-container shown in FIGS. 7 to 11 includes a first shell-like container member 200 adapted to be mounted on a corresponding frame member, for instance a frame bar 500, of a two-wheeler and a second container member 300 having the form of a lid. The two container members are designed such that a closed container is formed when the lid is mounted, the sidewalls and endwalls of the two container members merging one in the other. A lock 400 is disposed at the front end of the shell-like container member 200, the lock being actuatable by means of a suitable key (not shown).

FIG. 8 shows the safety-container during mounting of the second container member 300. This second container member 300 includes at its front end a downwardly projecting locking member 700 which has an angled end portion. When the lid is mounted a locking tongue 600 is rotated by turning the key inserted into the lock 400 so that the tongue abuts the angled end portion of the locking member 700 and locks the lid against lifting. The second container member 300 comprises a snap-in lug 800 at its rear end, said lug engaging under a retainer 900 at the endwall of the container member 200 when the lid is mounted upon the shell-like container member 200. Thereby lifting of this end of the lid is prevented. The container lid is set on such that initially the end provided with the snap-in lug 800 is mounted on the shell-like container member 200 until the lug 800 has engaged under the corresponding retainer 900 whereafter the lid end provided with the locking member 700 is mounted. For securing the lid on the shell-like container member 200 inner guide webs 1000 are provided at the upper ends of the sidewall of the container member, the guide webs engaging corresponding recesses on the inner surface of the sidewalls of the lid.

FIG. 9 shows the second container member 300 from underneath. According to the shown embodiment the safety-container serves for the storage of repair material or accessories for the two-wheeler. Accordingly, the second container member 300 is able to receive a pneumatic pump 301 which is clamped between two lugs 1200 disposed on corresponding cross walls 1100 of the lid.

FIG. 10 shows the shell-like container member 200 from above. The container member has a bottom member 1500 which is adapted to the shape of the frame member 500 and is thus curved in its cross-section in an approximately circular manner. Also the container member 200 is provided with cross walls 1400 in order to enable division into several compartments for the storage of repair material.

The fastening of the safety-container 100 on the frame member is done in the following manner:

The shell-like first container member 200 is fixed or secured on the frame member 500 by means of two clips 1700, as shown in FIG. 11. The clips 1700 enclose the frame member 500 and include two upwardly extending ends the end portions of which are angled outwardly. After the two clips 1700 have been fastened at the frame member the first container member 200 is positioned on the clips, the same extending into the container member through apertures 1600 provided in the bottom member 1500 of the container member. Thereafter the free ends of the clips are slightly urged inwardly and thus applied with a bias. They slip upwardly along retainer lugs 1300 which are oppositely disposed on the inner surfaces of the side walls of the container member 200 in the region of the aperture 1600. The angled end portions of the clip ends finally snap behind the retainer lugs 1300 due to their bias so that the shell-like container member 200 is securely fixed at the frame member 500. Now, the second container member 300 can be mounted in the above-described manner and the safety-container can be locked.

Opening of the container and detachment of the same from the frame member is done in a reversed manner. Hereby the clip ends can be urged inwardly by means of a suitable tool and can be thus detached from the retainer lugs. Then the container member 200 may be drawn off the frame member in an upward direction.

I claim:

1. A lockable safety-container for bicycles adapted to be mounted on an elongated bar-like frame member of the bicycle and comprising:
    a first container member (11) at least partially encompassing the frame member (13) and provided with a locking member (15) adapted to engage a locking means (14) disposed on a shell-like second container member (12) mateable with said first container member along abutting edges to form said container, said locking member and means retaining said first and second container members in a predetermined relative position when locked, said abutting edges having means (16, 17) mutually engageable by the movement of the edges toward and along each other to said predetermined position to lock the first and second container members together.

2. The safety container according to claim 1 characterized in that said mutually engaging means comprises L-shaped tabs (16) extending from the edge of one of said container members (12) and corresponding notches (17) in the other of said container members.

3. The safety container according to claim 1 wherein said first container member has a concave bottom adapted to the shape of the frame member and wherein said second member is generally semi-circular in cross-sectional configuration.

4. The safety-container according to claim 1, characterized in that the container member (11) encompassing the frame member (13) is provided with means (18) for securing the container member on the frame member.

5. The safety-container according to claim 4, characterized in that the container member (11) encompassing the frame member (13) is provided with clamping means (18) for securing the frame member.

6. The safety-container according to claim 1 characterized in that said first container member (11) has two locking members in the form of tongues (15) entering into said second container member (12) when said container members are assembled, a locking bar (19) of the locking means (14) passing through the tongues (15) when said first and second container members are assembled.

7. A lockable safety-container for bicycles adapted to be mounted on an elongated bar-frame member of the bicycle and comprising:
    a first end wall (40) formed as a container lid and adapted to be stationarily mounted on the frame member;
    a casing (30) adapted to the shape of the frame member and having a second end wall (140), said casing being adapted to be removably secured on the frame member in a position engaging said stationary end wall (40);
    means on the frame member and said casing for removably securing said casing to the frame member in said engagement position, said first end wall and casing being lockable together by locking means mounted in one of said end wall and casing and adapted to engage the other of said end wall and casing.

8. The safety container according to claim 7 characterized in that said casing has a wall abutting the frame member when said casing is mounted, and wherein said removable securing means comprises an opening in said abutting wall engaging a projection mounted on the frame member.

9. The safety-container according to claim 7, characterized in that the endwall (40) formed as a container lid is non-removably connected with the frame member (20) by means of welding.

10. The safety-container according to claim 7, characterized in that the endwall (40) formed as a container lid has a circumferential flange (60) provided with a seal (50), the circumferential flange engaging the container casing (30) when the container is closed.

11. The safety-container according to claim 7, characterized in that the locking means (70) comprises a stock-lock (100) actuatable by means of a key and provided with a rotatable locking tongue (110) engaging a locking tongue (120) provided at the container casing (30) in its closed position.

12. The safety-container according to claim 8, characterized in that the first container member (200) includes at least one cross-wall (1400).

13. A lockable-safety container for bicycles adapted to be mounted on an elongated bar-like frame member of the bicycle and comprising a first container member (200) at least partially encompassing the frame member and being open on its side turned away from the frame member; securing means for securing said first container member to the frame member, said securing means including resilient clips (1700) passing around the frame member and extending into said first container member, said first container member having retainer means (1300) in the inside adapted to engage said clips for retaining said first container member on the frame member; and a second container member (300) serving as a container lid, said second container being mountable on, and lockable to, said first container member to form said container.

14. The safety container according to claim 13 wherein said first and second container members have side walls and wherein said side walls of said second container member have inner guide webs (1000) for engaging corresponding recesses in the side walls of said first container member (200).

15. The safety container according to claim 13, characterized in that said second container member (300) is provided, at one endwall, with a snap-in lug (800) engaging behind a retainer on an endwall of said first container member, said second container member being provided, at another endwall, with a locking member (700) for a locking means (400) laterally disposed in said first container member (200).

16. The safety-container according to claim 15, characterized in that the locking means (400) includes a locking tongue (600) rotatable by a key and engageable with the locking member (700).

17. The safety-container according to claim 14, characterized in that the second container member (300) includes a cross-wall (1100) with an inwardly projecting lug (1200) for securely clamping a pneumatic pump in the front and rear end portion, respectively.

18. The safety-container according to claim 13, characterized in that the first container member (200) is provided with a bottom member (1500) adapted to the shape of the frame member (500), said bottom member having at least two apertures (1600) for passing said clips into said first container member.

19. The safety-container according to claim 18, characterized in that inwardly projecting retainer lugs (1300) are provided on sidewalls of the first container member (200) above the bottom apertures (1600), said clips having angled, free ends engaging behind these retainer lugs.

* * * * *